United States Patent
Miyayama et al.

(10) Patent No.: US 8,462,129 B2
(45) Date of Patent: Jun. 11, 2013

(54) TOUCH PANEL AND DISPLAY APPARATUS HAVING THE SAME

(75) Inventors: Takashi Miyayama, Tokyo (JP); Seiichiro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 453 days.

(21) Appl. No.: 12/785,825

(22) Filed: May 24, 2010

(65) Prior Publication Data

US 2010/0302204 A1     Dec. 2, 2010

(30) Foreign Application Priority Data

May 29, 2009   (JP) ................ 2009-130312

(51) Int. Cl.
*G06F 3/041* (2006.01)
(52) U.S. Cl.
USPC .......................................................... 345/173
(58) Field of Classification Search
USPC .................................................. 345/173–179
See application file for complete search history.

(56) References Cited

U.S. PATENT DOCUMENTS

| | | | |
|---|---|---|---|
| 2008/0224971 A1 | 9/2008 | Utsunomiya et al. | |
| 2008/0259044 A1 | 10/2008 | Utsunomiya et al. | |
| 2008/0309633 A1* | 12/2008 | Hotelling et al. | 345/173 |

FOREIGN PATENT DOCUMENTS

| | | |
|---|---|---|
| JP | 9-511086 | 11/1997 |
| JP | 2008-129708 | 6/2008 |
| JP | 2008-225824 | 9/2008 |
| JP | 2008-269297 | 11/2008 |
| WO | WO 95/27334 | 10/1995 |

\* cited by examiner

*Primary Examiner* — Kevin M Nguyen
*Assistant Examiner* — Cory Almeida
(74) *Attorney, Agent, or Firm* — Oblon, Spivak, McClelland, Maier & Neustadt, L.L.P.

(57) ABSTRACT

An object is to obtain a touch panel with improved sensitivity and enhanced display quality. A touch panel according to the present invention includes a touch screen including a plurality of first sensing lines formed of mesh-like conductors and arranged in parallel on a substrate, an insulating film formed over the substrate and the first sensing lines, a plurality of second sensing lines formed of mesh-like conductors and arranged in parallel on the insulating film, first dummy patterns arranged in areas opposed to areas between adjacent first sensing lines through the insulating film, and having a form as part of the mesh forms of the first sensing lines such that the adjacent first sensing lines form an apparently continuous mesh form in plan view, and second dummy patterns arranged in areas opposed to areas between adjacent second sensing lines through the insulating film, and having a form as part of the mesh forms of the second sensing lines such that the adjacent second sensing lines form an apparently continuous mesh form in plan view.

9 Claims, 5 Drawing Sheets

TOUCH PANEL AND DISPLAY APPARATUS HAVING THE SAME

BACKGROUND OF THE INVENTION

1. Field of the Invention

The present invention relates to a touch panel and a display apparatus having the touch panel.

2. Description of the Background Art

The touch panel function is conventionally known and receiving attention as one of good interface means, where a touch by, e.g. a finger, on the touch panel is detected and the coordinates of the touched position are specified for input operation. Such touch panels are manufactured as products using various schemes for detecting the position of touch by, e.g. a finger, such as resistive film schemes and capacitive schemes, for example.

The PCT (Projected Capacitive Touch screen) scheme is known as one of the capacitive schemes, where the front side of a touch screen having a touch sensor is covered by a protective plate, e.g. a glass plate having a thickness of several millimeters, such that a touch by, e.g. a finger on the protective plate can be detected (for example, refer to Japanese Patent Application Laid-Open No. 9-511086 (hereinafter referred to as Patent Document 1), from page 7 line 19 to page 8 line 4, same page line 23 to page 9 line 6, page 13 lines 4 to 12, and FIGS. 1, 2 and 8). The PCT scheme is advantageous in that the protective plate provided on the front side improves robustness, that it can even detect a touch by a gloved finger, and that it has no movable parts and so has a long life.

The touch screen of a touch panel using the PCT scheme described in Patent Document 1 has a first series of conductive material patterns (conductor elements) formed of a thin conductive film as sensing conductors for sensing capacitance, and a second series of conductive material patterns, with an insulating film formed therebetween. There is no electrical contact between the conductive material patterns, and the first series of conductive material patterns and the second series of conductive material patterns form a plurality of intersections. The conductor elements for sensing capacitance are connected to a capacitance controlled oscillator through an output line and a multiplexer. The output is counted by a divider to provide capacitance sensing data.

Materials most suitable as the conductive material are metal materials such as silver. On the other hand, since a touch panel is mainly used with a display apparatus, the visibility of the conductive material patterns can be a problem as a display characteristic. Therefore, transparent conductive films, such as indium oxide (ITO), may be used in order to reduce the visibility of the conductive material patterns. Also, conductive thin lines, several to 20 μm thick, may be used in place of conductive material patterns.

The capacitance controlled oscillator of such a touch panel can be a relaxation oscillator or a hysteresis oscillator. The oscillation cycle of such an oscillator is generally determined by the charge/discharge time constants of resistive and capacitive elements, and the capacitive elements are structured to include the capacitance formed between the sensing lines (conductor elements) and finger (hereinafter also referred to as touch capacitance). Then, when a finger of a user touches, the oscillation cycle of the oscillator varies according to the touch capacitance formed between the sensing lines and finger, and the amount of variation is detected to recognize the touch and its position.

For upsizing of such touch panels, it is required to obtain good sensing accuracy by reducing parasitic capacitance or line resistance occurring in the touch panel, and to obtain good display quality.

In touch panels in which the sensing lines are made of a transparent conductive film, the display quality of the display apparatus provided with the touch panel is not likely to be degraded due to the visibility of the sensing lines. However, such touch panels are likely to suffer reduced sensing accuracy because the transparent conductive film forming the sensing lines generally has high resistance value. Accordingly, it was difficult to upsize touch panels in which the sensing lines are made of a transparent conductive film.

On the other hand, in touch panels in which the sensing lines are made of a metal film good sensing accuracy is obtained even when the touch panels are upsized, because the line resistance is lower than that of sensing lines made of transparent conductive film.

However, when the sensing lines are formed of plain lines, the large areas of the lines degrade visibility. Accordingly, when the sensing lines are formed of a film, it is desirable to form each sensing line as a bundle of less visible thin lines having a line width of about several to 20 μm.

However, when the sensing lines are formed of bundles of thin lines, the resistance value is increased higher than when they are formed of plain lines. For example, when a length of a plain line is L, a width of the plain line is W1, and sheet resistance value of the plain line is ρ, and a length of a bundle of thin lines is L, a width of one thin line is W2, the number of thin lines is N, and sheet resistance value of each thin line is ρ, then the relation W2×N<W1 holds between the line widths per one sensing line. Also, the resistance R1 of the plain line is: R1=L/W1×ρ, and the resistance R2 of a bundle of thin lines, which is the parallel resistance of N thin lines, is: R2=(L/W2×ρ)/N. That is to say, from the expressions, the relation between the resistance values of plain line and bundle of thin lines is: R2>(L/W1×ρ), and it is seen that the resistance value of bundles of thin lines is higher than that of plain lines.

Also, because individual thin lines are formed thinly, they are likely to be influenced by abnormalities during pattern formation etc. When a pattern defect occurs due to some process abnormality, the defective pattern cannot contribute to the sensing operation and then the sensibility is considerably reduced. For example, when a sensing line is formed of three thin lines and one of them cannot contribute to the sensing operation due to a pattern defect caused by some process abnormality, then the sensibility is reduced to ⅔. This also reduces yield.

SUMMARY OF THE INVENTION

An object of the present invention is to obtain a touch panel with improved sensitivity and enhanced display quality, and a display apparatus having the same.

A touch panel according to the present invention includes a touch screen including a substrate, a plurality of first sensing lines arranged on the substrate, an insulating film formed over the substrate and the first sensing lines, and a plurality of second sensing lines arranged on the insulating film. The plurality of first sensing lines are formed of mesh-like conductors and arranged in parallel at given intervals in one direction. The plurality of second sensing lines are formed of mesh-like conductors and arranged in parallel at given intervals in another direction perpendicular to the one direction. The touch screen further includes first and second dummy patterns. The first dummy patterns are arranged in areas opposed to areas between adjacent first sensing lines through the insulating film, and have a form as part of the mesh forms of the first sensing lines such that adjacent first sensing lines form an apparently continuous mesh form in plan view. The second dummy patterns are arranged in areas opposed to areas between adjacent second sensing lines through the insulating film, and have a form as part of the mesh forms of the second sensing lines such that adjacent second sensing lines form an apparently continuous mesh form in plan view.

The use of mesh-like conductors as sensing lines provides large opening areas through which display light passes, whereby the reduction of transmittivity of the display light is suppressed. Also, individual thin lines forming the mesh form are physically and electrically connected in the same sensing line, whereby the resistance of the sensing line is low and sensitivity is improved. Furthermore, even when a pattern defect occurs, the reduction of sensitivity and the reduction of yield are suppressed. Also, dummy patterns are arranged in the regions between adjacent sensing lines, so that a plurality of sensing lines form an apparently continuous mesh form, whereby display quality is improved.

These and other objects, features, aspects and advantages of the present invention will become more apparent from the following detailed description of the present invention when taken in conjunction with the accompanying drawings.

DESCRIPTION OF THE PREFERRED EMBODIMENTS

First, the structure of a touch screen 1 of a touch panel 100 according to a preferred embodiment of the present invention will be described.

Figure 1A:
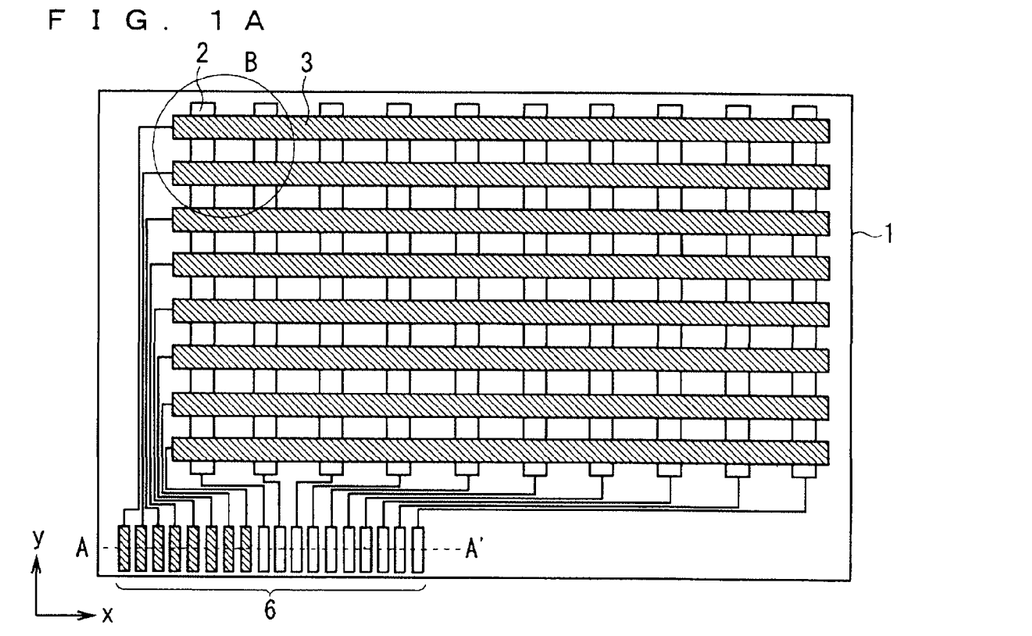
FIGS. 1A and 1B are diagrams illustrating the structure of a touch screen according to a preferred embodiment of the present invention.
Figure 1B:
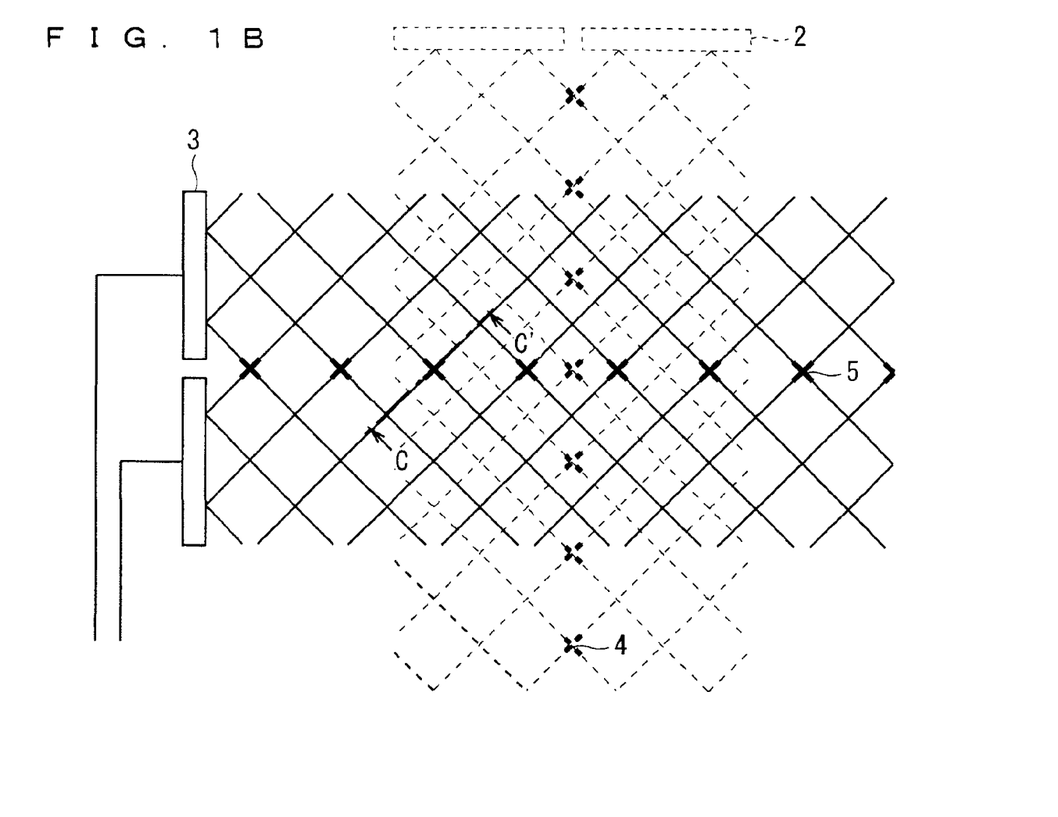

FIG. 1A is a plan view schematically illustrating the structure of the touch screen 1 of the preferred embodiment of the present invention. FIG. 1B is a diagram illustrating the region B in FIG. 1A in an enlarged manner. The touch screen 1 includes a plurality of sensing column lines 2 extending in the column direction (in y direction in FIG. 1A) and arranged in parallel at given intervals in the row direction (in x direction in FIG. 1A), a plurality of sensing row lines 3 extending in the row direction and arranged in parallel at given intervals in the column direction, and a plurality of terminals 6 for electrically connecting the sensing lines and external parts. As shown in FIG. 1B, the sensing column lines 2 and the sensing row lines 3 are formed of regularly arranged mesh-like conductors.

The touch screen 1 further includes a plurality of first dummy patterns 4 arranged between a plurality of adjacent sensing column lines 2 and having a form as part of the mesh form of the sensing column lines 2, and a plurality of second dummy patterns 5 arranged between a plurality of adjacent sensing row lines 3 and having a form as part of the mesh form of the sensing row lines 3.

As will be described later, the sensing lines formed of mesh-like conductors are adopted in order to reduce the line resistance and suppress the reduction of sensibility, as compared with when bundles of thin lines are adopted. Also, as will be described later, the dummy patterns are adopted to solve the reduction of display quality caused by stripes occurring between the sensing lines.

Next, the configuration of the touch panel 100 of the preferred embodiment of the present invention will be described.

Figure 2:
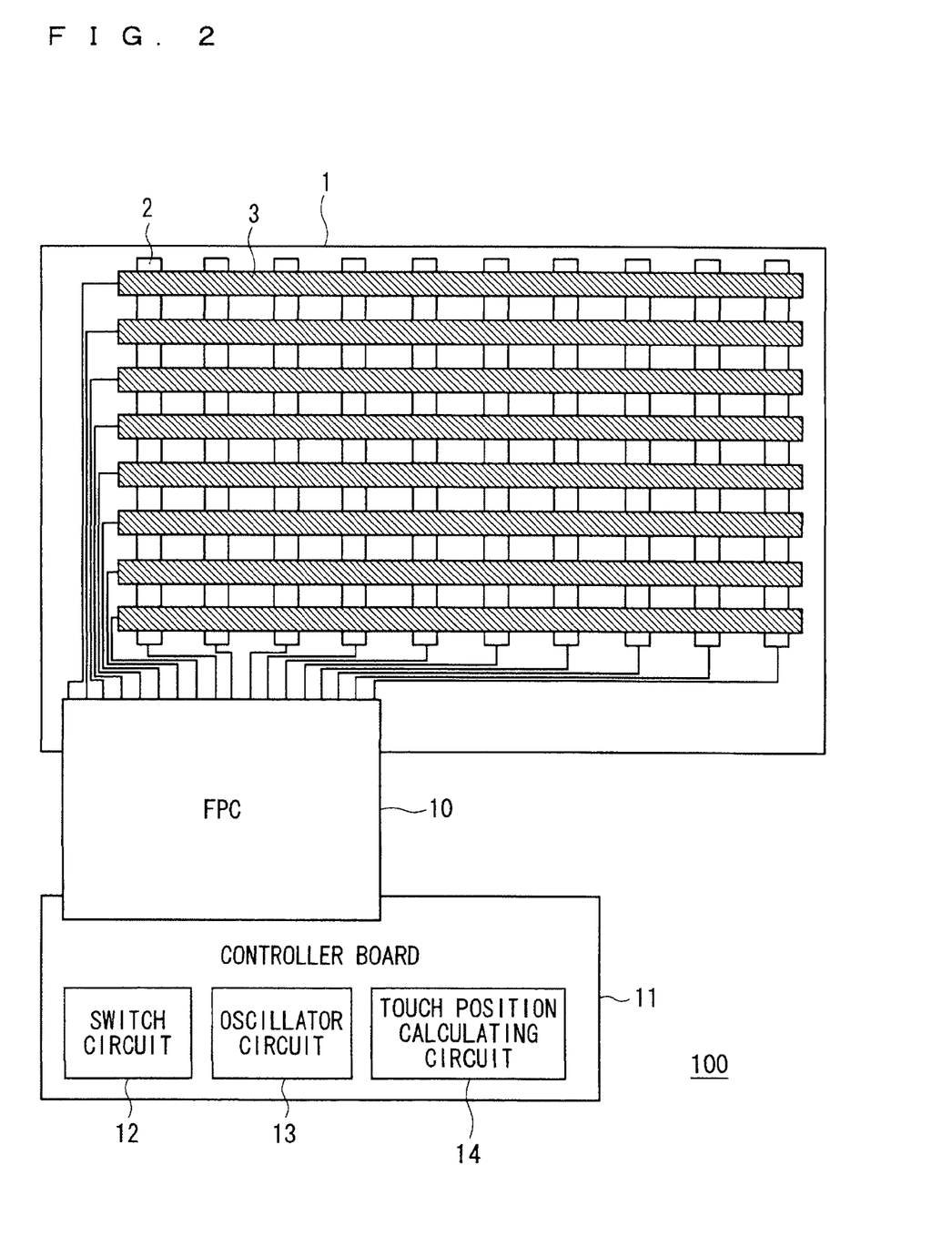
FIG. 2 is a diagram illustrating the configuration of a touch panel according to the preferred embodiment of the present invention.

FIG. 2 is a plan view illustrating the configuration of the touch panel 100. The touch panel 100 includes the touch screen 1 described above, a controller board 11 provided with a plurality of parts for controlling the function as the touch panel 100, and an FPC (Flexible Printed Circuit) 10 formed of, e.g. ACF (Anisotropic Conductive Film), electrically connecting the touch screen 1 and the controller board 11.

The controller board 11 is provided with a switch circuit 12 that sequentially selects and connects the sensing column lines 2 and the sensing row lines 3, an oscillator circuit 13 that is connected to the sensing lines selected by the switch circuit 12 and whose oscillation cycle varies according to capacitance formed between a pointer and sensing lines, and a touch position calculating circuit 14 that detects the capacitance formed between the pointer and sensing lines on the basis of the oscillation cycle of the oscillator circuit 13 and that, on the basis of the detected results, calculates the position touched by the pointer. The detected coordinate data is outputted to an external computer, for example.

Next, the cross-sectional structure of the touch screen 1 will be described.

Figure 3A:
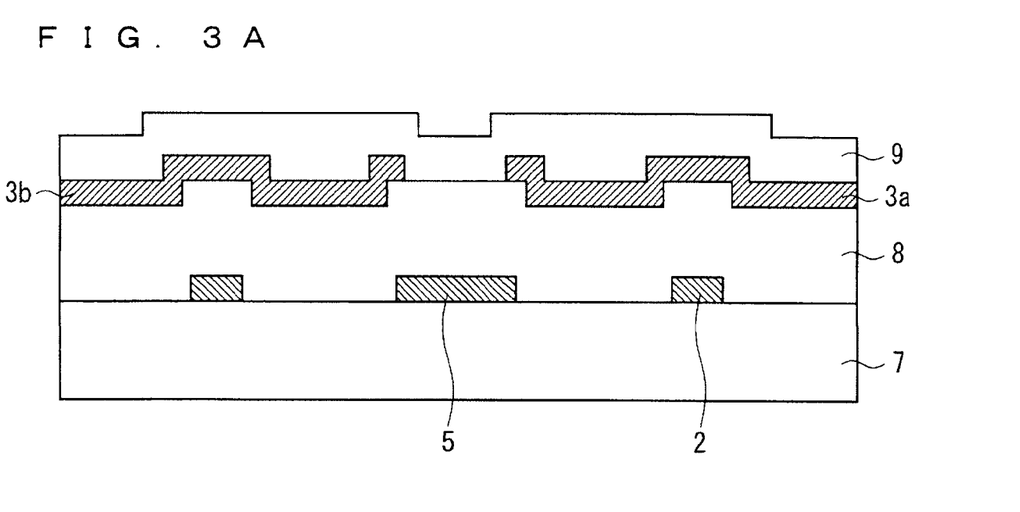
FIGS. 3A and 3B are cross-sectional views illustrating the structure of the touch screen according to the preferred embodiment of the present invention.
Figure 3B:
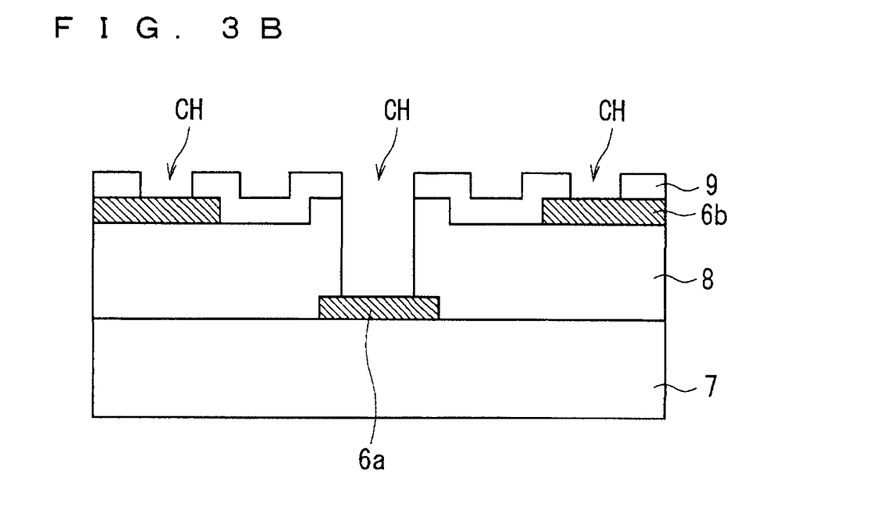

FIG. 3A is a diagram illustrating the cross section of the region C-C' of the touch screen 1 shown in FIG. 1B. FIG. 3B is a diagram illustrating part of the cross section of the region A-A' of the touch screen 1 shown in FIG. 1A.

The touch screen 1 includes a transparent substrate made of transparent glass or resin (hereinafter referred to also as a base substrate 7), sensing column lines 2 formed on the base substrate 7, a second dummy pattern 5 formed on the base substrate 7 and made of the metal pattern in the same layer as the sensing column lines 2, an interlayer insulating film 8 formed over the base substrate 7 to cover the sensing column lines 2 and second dummy pattern 5, sensing row lines 3 formed on the interlayer insulating film 8, and a protective film 9 formed over the interlayer insulating film 8 to cover the sensing row lines 3. Also, first dummy patterns 4 made of the metal pattern in the same layer as the sensing row lines 3 are formed on the interlayer insulating film 8, though they are not shown in the diagram since they are absent in the region C-C'.

Also, as shown in FIG. 3B, contact holes CH are formed over a terminal 6a connected to a sensing column line 2 and terminals 6b connected to sensing row lines 3.

As shown in FIG. 3A, the sensing row lines 3 and the second dummy pattern 5 are located with the interlayer insulating film 8 interposed therebetween, and so they are physically and electrically not connected. The second dummy pattern 5 is formed to at least include the region that is opposed to the region between the sensing row line 3a and the sensing row line 3b, with the interlayer insulating film 8 interposed therebetween. The sensing column lines 2 and the first dummy patterns 4 are in the same relation.

Next, the relation between the sensing lines and dummy patterns will be described.

Figure 4A:
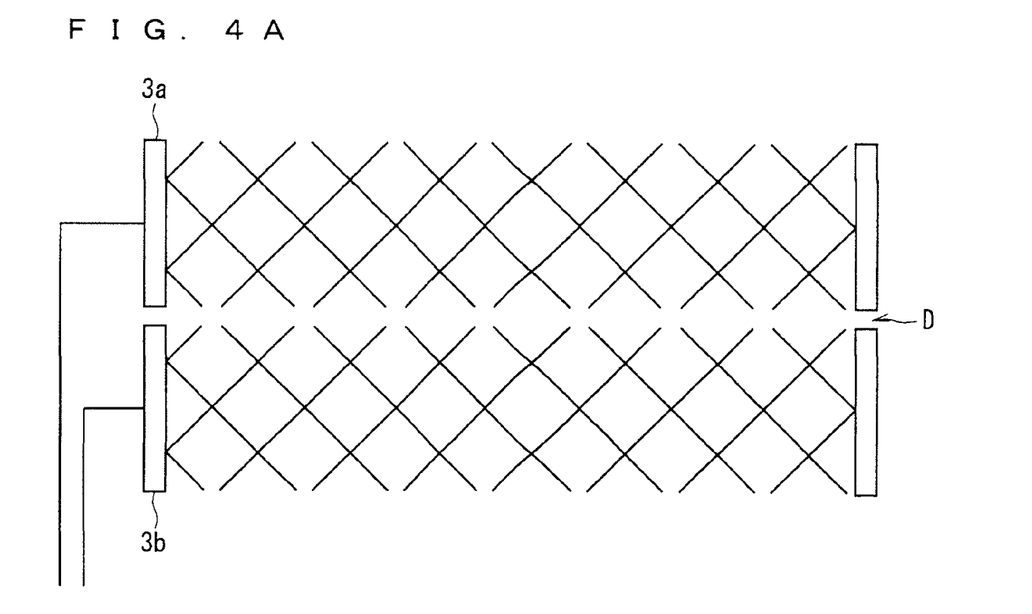
FIGS. 4A and 4B are diagrams illustrating the relation between sensing lines and dummy patterns according to the preferred embodiment of the present invention.
Figure 4B:
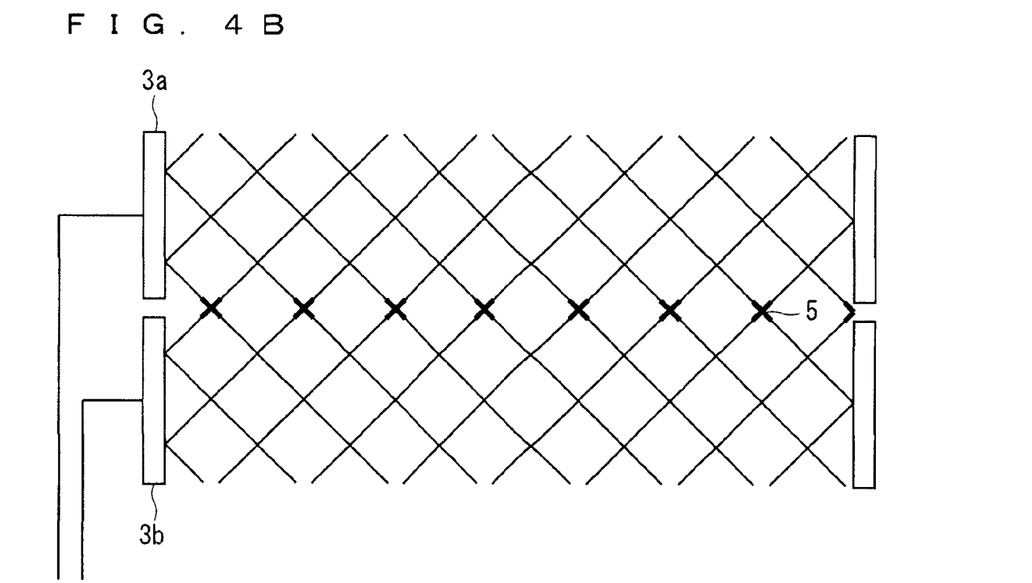

FIG. 4A is a diagram illustrating the configuration of sensing row lines 3. FIG. 4B is a diagram illustrating the relation between the sensing row lines 3 and second dummy patterns 5 corresponding to the sensing row lines 3. The region D shown in FIG. 4A is a border region between the sensing row line 3a and the sensing row line 3b, and the sensing row line 3a and the sensing row line 3b are physically and electrically not connected.

The dummy patterns 5 shown in FIG. 4B have a form as part of the mesh forms of the sensing row lines 3, and they are arranged in the region D such that the sensing row line 3a and the sensing row line 3b form a continuous mesh form. As described above, the second dummy patterns 5 are formed in a different layer from the sensing row lines 3, and the sensing row lines 3 and the second dummy patterns are physically and electrically not connected. That is to say, the sensing row line 3a and the sensing row line 3b, and the second dummy patterns 5, form an apparently continuous mesh form in plan view. Sensing column lines 2 and first dummy patterns 4 are in the same relation. i.e. they form an apparently continuous mesh form in plan view.

As shown in FIG. 1B, in this preferred embodiment, the sensing column lines 2 and the sensing row lines 3 are arranged such that the mesh form of the sensing column lines 2 and the mesh form of the sensing row lines 3 configure mesh forms that are shifted by ½ pitch in plan view. However, this arrangement is meant to be only illustrative and not restrictive, but the sensing column lines 2 and the sensing row lines 3 are arranged such that, when the sensing column lines 2 and the sensing row lines 3 are superimposed over each other, they form a uniform mesh pattern in plan view in the regions where they overlap. However, when the mesh form of the sensing column lines 2 and the mesh form of the sensing row lines 3 match with each other in plan view, the capacitance between the sensing column lines 2 and the sensing row lines 3 is increased and reduces the sensibility. Accordingly, it is preferred that the mesh form of the sensing column lines 2 and the mesh form of the sensing row lines 3 overlap in smaller areas in plan view.

Next, the sensing lines of the preferred embodiment will be compared with conventional sensing lines.

Conventional sensing lines having no openings (so-called plain lines) ensure large touch capacitance. However, the opening areas through which display light can pass are smaller. That is to say, when a touch screen having plain lines is located on the front side of a display panel, the plain lines prevent the passage of display light and reduce transmittivity of the display light.

When the sensing lines are formed of bundles of thin lines that are not individually connected, the line resistance is increased as described earlier than when plain lines are used. Also, as described earlier, the thin lines forming the sensing lines are preferably formed to a line width of about several to 20 μm so that visibility is not deteriorated. However, when the line width is thus thin, pattern defects are likely to occur during the line forming process described later, due to existence of foreign matter in areas where the sensing lines are located. Also, the lines are likely to be disconnected in areas where the sensing column and row lines three-dimensionally intersect. Such problems considerably reduce sensibility. Furthermore, since sensing lines have to be physically and electrically separated, larger intervals are formed in areas between the sensing lines than in areas where the sensing lines are located. That is, stripes are visually recognized between the sensing lines and display quality deteriorates.

In contrast, the sensing column lines 2 and the sensing row lines 3 of the preferred embodiment, formed of mesh-like conductors, provide large opening areas through which display light passes, whereby the reduction of transmittivity of the display light is suppressed. Also, the individual lines forming the mesh form in the same sensing line are physically and electrically connected together, and therefore current can flow in larger areas, whereby the line resistance is reduced and the sensing accuracy is enhanced, as compared to a bundle of thin lines in which the thin lines are not connected each other.

Also, because of the use of such mesh-like metal lines in which sensing lines are physically and electrically connected, even when a pattern defect occurs and the sensing line is disconnected in one area, the disconnection only slightly influences the sensing of capacitance, whereby the reduction of sensibility is suppressed and the reduction of yield is suppressed.

Also, in this preferred embodiment, the dummy patterns are arranged between adjacent sensing lines, so that the adjacent sensing lines form an apparently continuous mesh form in plan view. Accordingly, there are no optically discontinuous areas (stripes and the like) in the touch screen 1, and the touch screen 1 offers good visibility.

Next, a method of manufacturing the touch panel according to the preferred embodiment of the present invention will be described.

FIGS. 5A to 5F are diagrams illustrating the cross section of the region C-C' shown in FIG. 1B during the process of manufacturing the touch panel.

Figure 5A:
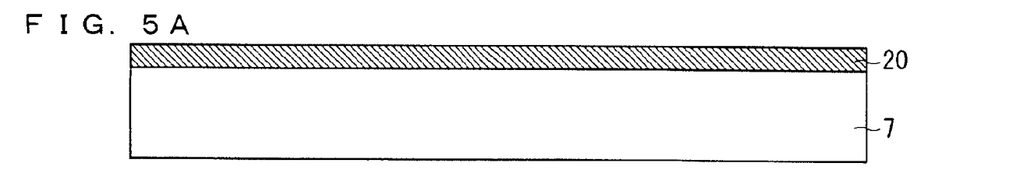
FIGS. 5A to 5F are cross-sectional views illustrating a method of manufacturing the touch screen according to the preferred embodiment of the present invention.

First, a transparent substrate (base substrate 7) made of transparent glass or resin is prepared. Next, a metal layer 20 mainly containing aluminum (e.g. Al alloy containing Ni, and AlNiNd is used in this preferred embodiment) is formed on the base substrate 7 by sputtering to a film thickness of 150 to 500 nm (FIG. 5A). As to the conditions of film formation, pressure is 0.2 to 0.5 Pa, DC power is 1.0 to 2.5 kW, power density is 0.17 to 0.43 W/cm$^2$, and film formation temperature is from room temperature to 180° C.

For the metal layer 20, a nitrided AlNiNdN layer may be formed over the AlNiNd layer in order to suppress reactions with the developer. As well as Al, Cu or Cu alloy may be used as low-resistance metal material, in which case, too, a film can be formed by sputtering as described about Al.

Figure 5B:
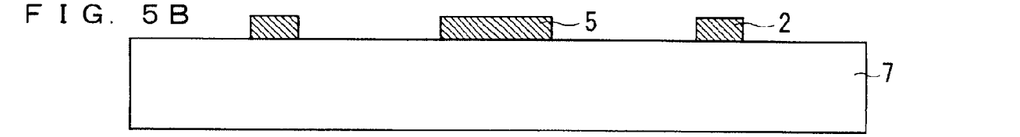

Next, resist is applied on the metal layer 20, and a photolithography step is performed such that the resist is shaped into the form of the sensing column lines 2 and the second dummy patterns 5. Next, an etching step is performed by using a mixed acid of phosphoric acid, nitric acid and acetic acid, so as to pattern the metal layer 20 to form the sensing column lines 2 and second dummy patterns 5 (FIG. 5B). Defects like disconnections can be prevented during the following formation of other films by forming the sensing column lines 2 in tapered form in cross section. The etching process may use other etching liquid, as well as mixed acid of phosphoric acid, nitric acid and acetic acid. Also, the process step may adopt dry etching.

Figure 5C:
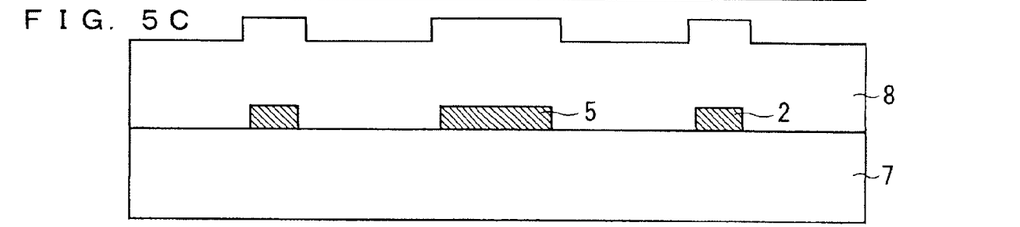

Next, by CVD, for example, the interlayer insulating film 8 is formed over the base substrate 7 to cover the sensing column lines 2 and second dummy patterns 5 (FIG. 5C). A silicon oxide ($SiO_2$) film having low dielectric constant is formed as the interlayer insulating film 8. As to the conditions of formation of silicon oxide film. $SiH_4$ flow rate is 10 to 50 sccm, $N_2O$ flow rate is 200 to 500 sccm, film formation pressure is 50 Pa, RF power is 50 to 200 W, power density is 0.015 to 0.67 W/cm$^2$, and film formation temperature is 200 to 300° C.

It is preferable to form the interlayer insulating film 8 as thick as possible, in order to reduce parasitic capacitance formed by the lower-layer lines (sensing column lines 2) and the upper-layer lines (sensing row lines 3), and the film thickness is determined by considering productivity. The interlayer insulating film 8 is not limited to $SiO_2$ film, but SiN film or SiON film may be used, for example. In such a case, hydrogen, nitrogen and $NH_3$ are added to the gases mentioned above.

Figure 5D:
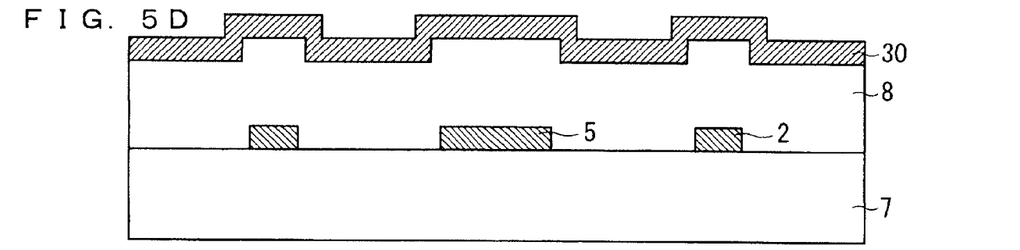

Next, a metal layer 30 mainly containing aluminum (e.g. Al alloy containing Ni, and AlNiNd is used in this preferred embodiment) is formed over the interlayer insulating film 8 by sputtering to 200 to 1000 nm (FIG. 5D). As to the conditions of film formation, pressure is 0.2 to 0.5 Pa, DC power is 1.0 to 2.5 kW, power density is 0.17 to 0.43 $W/cm^2$, and film formation temperature is from room temperature to 180° C.

For the metal layer 30, a nitrided AlNiNdN layer may be formed over the AlNiNd layer in order to suppress reactions with the developer. As well as Al, Cu or Cu alloy may be used as low-resistance metal material, in which case, too, a film can be formed by sputtering as described about Al. Production efficiency can be enhanced by thus using the same material for the sensing column lines 2 and sensing row lines 3 as described in the preferred embodiment.

Figure 5E:
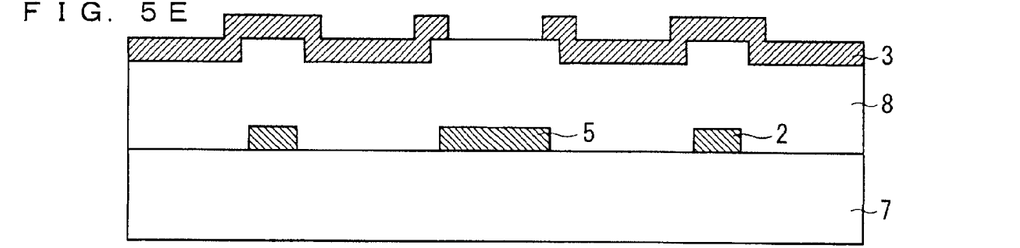

Next, resist is applied on the metal layer 30, and a photolithography step is performed such that the resist is shaped into the form of the sensing row lines 3 and the first dummy patterns 4. Next, an etching step is performed by using a mixed acid of phosphoric acid, nitric acid and acetic acid, and the metal layer 30 is patterned to form the sensing row lines 3 and first dummy patterns 4 (FIG. 5E). The etching process may use other etching liquids, as well as mixed acid of phosphoric acid, nitric acid and acetic acid. The process may adopt dry etching.

Figure 5F:
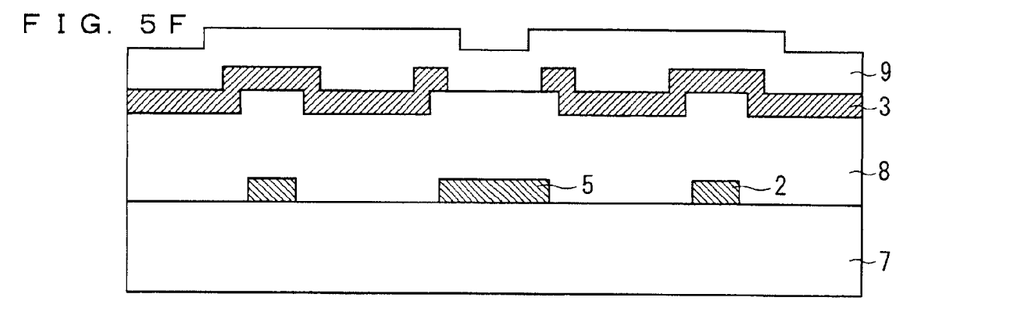

Next, by CVD, for example, the protective film 9 is formed over the interlayer insulating film 8 to cover the sensing row lines 3 and the first dummy patterns 4 (FIG. 5F). As to the protective film 9, in order to obtain good visibility, it is preferable to use the same kind of film as the interlayer insulating film 8, and a film of silicon oxide ($SiO_2$) is used in this preferred embodiment. The film thickness of the protective film 9 is determined by considering coverage and productivity.

Next, resist is applied over the protective film 9, and a photolithography step is performed such that the resist is shaped into the form of contact holes CH for connection with the FPC. Next, an etching step is performed by using plasma of mixed gas of $CF_4$ and $O_2$, and the protective film 9 and the interlayer insulating film 8 are patterned together to form the connecting contact holes CH.

The touch screen 1 described above can be manufactured by using the process steps described above. The controller board 11 provided with various circuits is connected to the touch screen 1 through the FPC 10, whereby the touch panel can be manufactured.

The touch screen 1 produced by these process steps is bonded directly to a liquid-crystal display panel, whereby the entire apparatus can be formed thinner without a need for a structure for holding the touch screen 1, as was conventionally required.

Also, because the touch screen 1 and liquid-crystal display panel are thus integrated, dust etc. are prevented from entering the gap between the touch screen and liquid-crystal display panel, whereby adverse effects on display, caused by such dust etc., are prevented.

Also, this preferred embodiment has described an application to a liquid-crystal display apparatus, but the same structure can be obtained when it is applied to display apparatuses of other types, such as organic EL (Electro-Luminescence) display apparatuses or PDP (Plasma Display Panel) apparatuses.

Also, this preferred embodiment has described a structure in which the sensing column lines 2 and the second dummy patterns 5, and the sensing row lines 3 and the first dummy patterns 4, are formed of the same metal layers, but this is meant to be only illustrative and not restrictive. They may be formed of different metal layers, as long as the sensing column lines 2 and the first dummy patterns 4, and the sensing row lines 3 and the second dummy patterns 5, are separated by the interlayer insulating film 8.

As described so far, according to the preferred embodiment, the use of mesh-like metal lines as sensing lines provides larger opening areas through which display light passes, whereby the reduction of transmittivity of the display light is suppressed. Also, the use of physically and electrically connected mesh-like metal lines as sensing lines reduces line resistance and enhances sensitivity. Also, even when pattern defects occur, the reduction of sensitivity and reduction of yield are suppressed. Also, dummy patterns are arranged between adjacent sensing lines so that the adjacent sensing lines form an apparently continuous mesh form in plan view, whereby display quality is enhanced.

While the invention has been described in detail, the foregoing description is in all aspects illustrative and not restrictive. It is understood that numerous other modifications and variations can be devised without departing from the scope of the invention.

What is claimed is:

1. A touch panel having a touch screen comprising:
a substrate;
a plurality of first sensing lines formed of first conductors and arranged in parallel on the substrate at given intervals in one direction and each first sensing line of the plurality of first sensing lines defines a single mesh-like pattern of respective first conductors;
an insulating film formed over the substrate and the first sensing lines;
a plurality of second sensing lines formed of second conductors and arranged in parallel on the insulating film at given intervals in another direction perpendicular to the one direction and each second sensing line of the plurality of second sensing lines defines a single mesh-like pattern of respective second conductors;
first dummy patterns arranged in areas opposed to areas between adjacent first sensing lines through the insulating film, and having a form such that adjacent first sensing lines form a continuous pattern in plan view; and
second dummy patterns arranged in areas opposed to areas between adjacent second sensing lines through the insulating film, and having a form such that adjacent second sensing lines form another continuous pattern in plan view.

2. The touch panel according to claim 1,
wherein the first dummy patterns are formed on the insulating film, and
the second dummy patterns are formed on the substrate.

3. The touch panel according to claim 2,
wherein the first dummy patterns are formed of a same conductive film as the second sensing lines, and
the second dummy patterns are formed of a same conductive film as the first sensing lines.

4. The touch panel according to claim 1, wherein the first sensing lines and the second sensing lines are arranged such that the single mesh-like patterns of the first sensing lines and the single mesh-like patterns of the second sensing lines are shifted in plan view.

5. The touch panel according to claim 4, wherein the first sensing lines and the second sensing lines are arranged such that the single mesh-like patterns of the first sensing lines and the single mesh-like patterns of the second sensing lines are shifted by ½ pitch in plan view.

6. The touch panel according to claim 1, further comprising:
    a switch circuit that sequentially selects and connects the plurality of first sensing lines and the plurality of second sensing lines;
    an oscillator circuit that is connected to sensing lines selected by the switch circuit with an oscillation cycle that varies according to capacitance formed between a pointer and the sensing lines selected; and
    a touch position calculating circuit that detects, the capacitance formed between the pointer and the sensing lines selected, on the basis of the oscillation cycle of the oscillator circuit and that, on the basis of a detected result, calculates a position touched by the pointer.

7. A display apparatus comprising:
    a liquid-crystal display panel; and
    a touch panel according to claim 6, wherein a touch screen of the touch panel is provided on a front side of the liquid-crystal display panel.

8. The display apparatus according to claim 7, wherein the touch screen is bonded to the front side of the liquid-crystal display panel.

9. The touch panel according to claim 1, wherein
    the first dummy patterns in plan view connect respective single mesh-like patterns of the plurality of first sensing lines such that for each pair of adjacent first sensing lines, respective first conductors of one first sensing line are continuous with respective first conductors of an adjacent first sensing line, and
    the second dummy patterns connect in plan view respective single mesh-like patterns of the plurality of second sensing lines such that for each pair of adjacent second sensing lines, respective second conductors of one second sensing line are continuous with respective second conductors of an adjacent second sensing line.

* * * * *